United States Patent
Matthews et al.

(10) Patent No.: US 11,333,404 B2
(45) Date of Patent: May 17, 2022

(54) CRYOGENIC COOLING SYSTEM (71) Applicant: Oxford Instruments Nanotechnology Tools Limited, Abingdon Oxon (GB)

(72) Inventors: Anthony Matthews, Abingdon Oxon (GB); Mark Patton, Abingdon Oxon (GB)

(73) Assignee: Oxford Instruments Nanotechnology Tools Limited, Abingdon (GB)

( * ) Notice: Subject to any disclaimer, the term of this patent is extended or adjusted under 35 U.S.C. 154(b) by 309 days.

(21) Appl. No.: 16/441,560

(22) Filed: Jun. 14, 2019

(65) Prior Publication Data
US 2019/0383525 A1 Dec. 19, 2019

(30) Foreign Application Priority Data

Jun. 19, 2018 (GB) ..................................... 1810020

(51) Int. Cl.
*F25B 9/02* (2006.01)
*F25B 9/10* (2006.01)
(Continued)

(52) U.S. Cl.
CPC .................. *F25B 9/02* (2013.01); *F25B 9/10* (2013.01); *F25B 9/145* (2013.01); *F25B 49/022* (2013.01);
(Continued)

(58) Field of Classification Search
CPC .... F25B 9/02; F25B 9/145; F25B 9/10; F25B 25/005; F28D 2021/0033; F28D 15/025; F28D 15/02; F28F 2013/008; H01H 37/00
See application file for complete search history.

(56) References Cited

U.S. PATENT DOCUMENTS 10,258,253 B2 * 4/2019 Garside ..................... F25B 9/14
2013/0023418 A1 * 1/2013 Ackermann ........ G01R 33/3804
505/162

FOREIGN PATENT DOCUMENTS

| GB | 2485670 A | 5/2012 |
| GB | 2504187 A | 1/2014 |
| GB | 2551356 A | 12/2017 |

OTHER PUBLICATIONS

Search Report issued in Great Britain application No. GB1810020.6, 3 pages.

* cited by examiner

*Primary Examiner* — Lionel Nouketcha
(74) *Attorney, Agent, or Firm* — Brooks, Cameron & Huebsch, PLLC (57) ABSTRACT

A cryogenic cooling system is provided comprising: a mechanical refrigerator, a heat pipe and a heat switch assembly. The mechanical refrigerator has a first cooled stage and a second cooled stage. The heat pipe has a first part coupled thermally to the second cooled stage and a second part coupled thermally to a target assembly. The heat pipe is adapted to contain a condensable gaseous coolant when in use. The heat switch assembly comprises one or more gas gap heat switches, a first end coupled thermally to the second cooled stage and a second end coupled thermally to the target assembly. The cryogenic cooling system is adapted to be operated in a heat pipe cooling mode in which the temperature of the second cooled stage is lower than the first cooled stage and wherein the temperature of the target assembly causes the coolant within the second part of the heat pipe to be gaseous and the temperature of the second cooled stage causes the coolant in the first part of the heat pipe to condense. The target assembly is cooled by the movement of the condensed liquid coolant from the first part (Continued)

of the heat pipe to the second part of the heat pipe during the heat pipe cooling mode. The cryogenic cooling system is further adapted to be operated in a gas gap cooling mode in which the temperature of the second cooled stage causes freezing of the coolant. The heat switch assembly is adapted to provide cooling from the second cooled stage to the target assembly during the gas gap cooling mode via the one or more gas gap heat switches.

20 Claims, 5 Drawing Sheets

(51) Int. Cl.
    *F25B 9/14*           (2006.01)
    *F25D 19/00*         (2006.01)
    *F25B 49/02*         (2006.01)
    *G05D 23/00*        (2006.01)
    *F28F 13/00*         (2006.01)
(52) U.S. Cl.
    CPC ........... *F25D 19/006* (2013.01); *G05D 23/00* (2013.01); *F25B 2309/021* (2013.01); *F28F 2013/008* (2013.01)

CRYOGENIC COOLING SYSTEM

FIELD OF THE INVENTION

The present invention relates to a cryogenic cooling system and a method for operating this system.

BACKGROUND TO THE INVENTION

There are a number of technological applications which require cooling to low temperatures and in particular cryogenic temperatures, which may be thought of as those below 100 kelvin. Liquid helium-4 is often used as a cryogenic coolant due to its boiling point at atmospheric pressure of around 4 kelvin. Superconducting magnets and other experimental devices are traditionally cooled to around 4 kelvin using liquid cryogens, these including nitrogen and helium. The relatively large enthalpy content of these cryogens in either liquid or gaseous form ensures a rapid cooling from room temperature down to that of the cryogen in question. Despite the widespread use and success of liquid cryogens, the apparatus necessary to handle such low temperature liquids is often rather bulky, complicated and expensive. Furthermore, the relative scarcity of helium increasingly makes the use of this cryogen unfavourable.

Thus there has been a general trend towards the reduction of the volumes of liquid cryogens used, their cooling power being replaced by mechanical cryo-coolers ("mechanical refrigerators" herein), these include pulse-tube refrigerators, Gifford McMahon and Stirling refrigerators. Recent developments in double-staged mechanical refrigerators have enabled a more cost-effective and convenient cooling procedure. However, one particular disadvantage of such mechanical refrigerators is that the relatively small cooling power of the second stage (having the lower base temperature of the two stages) means that it takes significantly longer to cool a target assembly using mechanical refrigerators in comparison with liquid cryogens. This is particularly true when the target assembly has a high thermal mass.

In some known systems the target assembly is placed in thermal communication with the second stage via a pre-cooling circuit in which a cryogenic fluid may flow. The cryogen hence acts as a removable heat transfer medium which enables the target assembly to be cooled to temperatures below that of the second stage. With the fluid flowing through the circuit, the target assembly is cooled to a temperature equal to the second cooled stage. Removing the fluid and operating another cooling means then enables the temperature of the target assembly to be reduced further. The pre-cooling circuit forms a severable thermal link between the second stage and the target assembly without the need for any physical movement of couplings, linkages and so on that are can be practically difficult to achieve and can generate unwanted heat. It is desirable to reduce the cool down time however from what is obtainable using such systems.

SUMMARY OF THE INVENTION

A first aspect of the invention provides a cryogenic cooling system comprising:
 a mechanical refrigerator having a first cooled stage and a second cooled stage, the second cooled stage being configured to reach a lower base temperature than the first cooled stage;
 a heat pipe having a first part coupled thermally to the second cooled stage and a second part coupled thermally to a target assembly, the heat pipe being adapted to contain a condensable gaseous coolant when in use;
 a heat switch assembly comprising one or more gas gap heat switches, the heat switch assembly having a first end coupled thermally to the second cooled stage and a second end coupled thermally to the target assembly;
 wherein the cryogenic cooling system is adapted to be operated in a heat pipe cooling mode in which the temperature of the second cooled stage is lower than the first cooled stage and wherein the temperature of the target assembly causes the coolant within the second part of the heat pipe to be gaseous and the temperature of the second cooled stage causes the coolant in the first part of the heat pipe to condense, whereby the target assembly is cooled by the movement of the condensed liquid coolant from the first part of the heat pipe to the second part of the heat pipe;
 wherein the cryogenic cooling system is further adapted to be operated in a gas gap cooling mode in which the temperature of the second cooled stage causes freezing of the coolant; and
 wherein the heat switch assembly is adapted to provide cooling from the second cooled stage to the target assembly during the gas gap cooling mode via the one or more gas gap heat switches.

The combination of the heat pipe and the heat switch assembly forms a thermal switch for placing the target assembly in thermal communication with the second cooled stage. This arrangement ensures that the second cooled stage cools the target assembly efficiently, thereby reducing the overall cool down time for the system. Furthermore this arrangement avoids the need for moving parts that may generate unwanted additional heat loads. Various possible thermal switches have been considered by the inventors before arriving at this arrangement, as will be described below.

The sole use of one or more gas gap heat switches to thermally couple the second cooled stage and the target assembly does not enable sufficiently rapid cool down of the target assembly. For example, for a multi-stage apparatus, a gas gap heat switch may be provided for cooling each stage. However, when multiple gas gap heat switches are provided, a temperature gradient is required across each switch to promote heat flow, thereby limiting the overall efficiency of the cool down process. Similarly the sole use of a heat pipe is not sufficiently effective. Using the latent heat of vaporisation of their working fluid, heat pipes can provide an extremely high conductance. Their operational range is limited however: making them unsuitable for cooling the target assembly from room temperature to the temperature of the second cooled stage.

These problems may be overcome however by the combined use of a heat pipe and a heat switch assembly as claimed. The heat pipe is arranged to "short-circuit" the thermal gradient across the heat switch assembly to provide improved cooling between the second cooled stage and the target assembly over its operational range. The heat switch assembly remains operational over a much broader temperature range however, thereby enabling the target assembly to be cooled from room temperature to the temperature of the second cooled stage. The cool down time of the target assembly may hence be significantly reduced.

The term "coupled thermally" used herein refers to a high thermal conductivity link between two apparatus. This link may be in the form of a direct mounting between the apparatus, or it may include an intermediary linking member having a high thermal conductivity (typically above 1000

Watts per meter kelvin at a temperature of 20 kelvin) such as is provided by the use of copper.

The heat pipe and heat switch assembly enable the target assembly to be thermally disconnected from the second cooled stage so that the target assembly may be cooled to a temperature below that of the second cooled stage. The system may therefore comprise a target refrigerator, wherein the target assembly comprises a cooling element of the target refrigerator, said cooling element being configured to reach a lower base temperature than the first and second cooled stages. For example, the target refrigerator may comprise a dilution refrigerator, the dilution refrigerator comprising a still, a cooled member and a mixing chamber, wherein the cooled member is arranged between the still and the mixing chamber, and wherein the mixing chamber forms the cooling element. It will be understood that the still may apply further cooling to the system during use, however it is typically the mixing chamber which is arranged to form part of the target assembly, rather than the still.

A plurality of cooled stages may be provided between the second cooled stage and the target assembly, each cooled stage having a respective base temperature below that of the second cooled stage. For example, in the event that a dilution refrigerator is provided, the still and the mixing chamber will have different base temperatures (typically around 1 kelvin and 0.01 kelvin or less respectively). In addition, the cooled member may be held at an intermediate temperature between that of the still and the mixing chamber (typically at around 0.1 kelvin or less during steady state operation). The heat switch assembly may advantageously form a thermal switch between each of these apparatus so that they can be thermally connected and disconnected from the second cooled stage of the mechanical refrigerator. For example, the heat switch assembly may comprise a first gas gap heat switch, a second gas gap heat switch and a third gas gap heat switch, wherein the first gas gap heat switch is coupled thermally to the second cooled stage and the still, wherein the second gas gap heat switch is coupled thermally to the still and the cooled member, and wherein the third gas gap heat switch is coupled thermally to the cooled member and the mixing chamber.

Each gas gap heat switch typically has opposing first and second ends between which heat transfer may be controlled. Hence, the second cooled stage may be connected to the first end of the first gas gap heat switch; the still may be connected to the second end of the first gas gap heat switch and the first end of the second gas gap heat switch; the cooled member may be connected to the second end of the second gas gap heat switch and the first end of the third gas gap heat switch; and the mixing chamber may be connected to the second end of the third gas gap heat switch. These connections are typically thermal connections achieved using a high thermal conductivity linking member.

In an alternative implementation only one intermediate cooled stage may be provided between the second cooled stage and the target assembly. For example, the system may comprise a cooled member arranged between the second cooled stage and the target assembly, wherein the heat switch assembly comprises a first gas gap heat switch coupled thermally to the second cooled stage and the cooled member, and a second gas gap heat switch coupled thermally to the cooled member and the target assembly. Hence, the second cooled stage may be connected to the first end of the first gas gap heat switch; the cooled member may be connected to the second end of the first gas gap heat switch and the first end of the second gas gap heat switch; and the target assembly may be connected to the second end of the second gas gap heat switch. This arrangement is particularly useful wherein the target refrigerator comprises a continuous helium-3 refrigerator, for example.

The system preferably further comprises one or more heat radiation shields arranged between the second cooled stage and the target assembly. One of these heat radiation shields may form or be coupled thermally to the cooled member referred to previously. Furthermore a heat radiation shield may be provided to form a thermal link between the second cooled stage and the heat switch assembly. This will help to thermally isolate the target assembly from any higher temperature stages and the ambient environment outside during steady state operation.

The one or more gas gap heat switches are preferably configured to contain a thermally conductive gas during the gas gap cooling mode, and the heat switch assembly is preferably further configured to remove the thermally conductive gas from the one or more gas gap heat switches so as to substantially thermally isolate the second cooled stage from the target assembly. It is particularly desirable that each gas gap heat switch comprises two elongate conductors aligned along a common major axis, wherein said elongate conductors are separated from each other by a gap configured to contain the thermally conductive gas during the gas gap cooling mode. Each said gas gap heat switch may comprise a stainless steel wall configured to contain the thermally conductive gas so as to cause thermal conduction across the switch. Such switches have been found to have excellent performance in this context both in terms of having a high effective thermal conductivity when closed, and a high switching ratio (which determines the residual heat leak into the system once the switch is open). For example, stainless steel has an exceptionally low thermal conductivity at cryogenic temperatures. The heat exchange across the switch may hence be adjusted by controlling the amount of thermally conductive gas between the two conductors. The thermally conductive gas is typically contained within each gas gap heat switch during the heat pipe cooling mode, as well as during the gas gap cooling mode.

As discussed above in many instances it is desirable that the target assembly is able to reach a base temperature below that of the second cooled stage. The cryogenic cooling system may then be further adapted to be operated in a low temperature cooling mode in which the coolant is frozen, the thermally conductive gas is removed from the one or more gas gap heat switches and the cooling element of the target refrigerator is operated so as to cool the target assembly to a lower temperature than the first and second cooled stages. The low temperature cooling mode is therefore typically the last cooling mode applied in the cooldown process.

The target assembly typically comprises a target apparatus, which may be in the form of a docking station arranged to receive a sample carrier that supports a sample. The reduced cool down time achieved by the combination of the heat switch assembly and the heat pipe is particularly appreciable for systems in which the target assembly has a high thermal mass. Preferably therefore the target apparatus has a physical mass of at least 10 kilograms, more preferably at least 20 kilograms.

The heat pipe preferably contains, when in use, a gaseous coolant which is capable of being condensed into coolant liquid in the apparatus. The generation of the liquid condensate provides a vehicle for the cooling power of the second cooled stage to be delivered to the target assembly. This will almost always be a gravity-driven process or could use alternative processes such as the expansion of vaporised coolant to drive the fluid flow.

It will be appreciated that the interior of the heat pipe typically comprises a housing defining an internal volume for containing the coolant and which contains the first and second parts in fluid communication with one another. Thus the geometry of the volume may be very simple; indeed it may take the form of a simple cylindrical volume. The first and second parts are typically corresponding first and second ends or end regions of the heat pipe, particularly in the case of a generally cylindrical volume. Regardless of the exact geometry, the first and second parts are typically substantially thermally isolated from each other at cryogenic temperatures (except by movement of the coolant). The housing of the heat pipe is preferably formed substantially of stainless steel due to its low thermal conductivity at cryogenic temperatures.

It will be appreciated that the choice of the type of coolant and indeed the pressure at which it is supplied to the heat pipe is application specific. An example of a suitable coolant however is neon. This has a relatively narrow range of temperatures at which liquid can exist (this being due to a boiling point of about 27 kelvin and a melting point of about 25 kelvin at atmospheric pressure).

The heat pipe will only function effectively if the first part is cooled to a temperature which causes condensation of the gaseous coolant whereas that of the second part causes evaporation. Upon operating the mechanical refrigerator, the temperature of the second cooled stage may fall below the temperature at which the coolant remains liquid. The coolant may therefore solidify which thereafter prevents the heat pipe from operating. In order to prolong the heat pipe cooling mode, the apparatus may further comprise a control system which is adapted to control the environment in the first part of the heat pipe when the apparatus is in the heat pipe cooling mode so as to ensure that the gaseous coolant is able to condense but not freeze.

The environment within the heat pipe may therefore be controlled in terms of the pressure and/or temperature of the gas. The temperature is the more readily controllable variable and typically therefore the control system comprises a heater in thermal communication with the first part of the heat pipe. The operation of such a heater ensures that the local temperature in the first part of the heat pipe is maintained within a range which allows the condensation of the coolant gas.

The apparatus may also further comprise an external volume which is placed in fluid communication with the interior of the heat pipe. Such a volume may take the form of a reservoir or storage tank and may be used not only to supply the coolant to the heat pipe initially but also to control the pressure of the coolant within the heat pipe during the various stages of operation of the apparatus. Thus such an external volume may be used by the control system as part of a pressure control function.

A second aspect of the invention provides a method of operating a cryogenic cooling system, the cryogenic cooling system comprising a mechanical refrigerator having a first cooled stage and a second cooled stage, the second cooled stage being configured to reach a lower base temperature than the first cooled stage; a heat pipe having a first part coupled thermally to the second cooled stage and a second part coupled thermally to a target assembly, the heat pipe containing a condensable gaseous coolant, a heat switch assembly comprising one or more gas gap heat switches, the heat switch assembly having a first end coupled thermally to the second cooled stage of the mechanical refrigerator and a second end coupled thermally to the target assembly;

the method comprising the following steps:

i) causing the target assembly to adopt a temperature sufficient to ensure the coolant within the second part of the heat pipe is in the gaseous phase;

ii) operating the mechanical refrigerator to cause the second cooled stage to adopt a temperature which causes the coolant within the first part of the heat pipe to condense;

iii) cooling the target assembly during a heat pipe cooling mode in which the temperature of the second cooled stage is lower than the first cooled stage by causing the movement of the condensed coolant from the first part of the heat pipe to the second part of the heat pipe; and iv) cooling the target assembly during a gas gap cooling mode in which the temperature of the second cooled stage causes the coolant within the heat pipe to freeze, and wherein further cooling of the target assembly is applied by the second cooled stage via the one or more gas gap heat switches.

The second aspect shares similar advantages as discussed in connection with the first aspect. It may further incorporate any of the apparatus discussed in connection with the first aspect.

The coolant in the heat pipe will typically be gaseous at room temperatures. Step (i) may therefore be automatically satisfied upon installation of the system and prior to any cooling operations being performed. Once the cool down process has begun, and prior to the heat pipe cooling mode, the target assembly is typically principally cooled via the gas gap heat switch assembly, which is typically in its closed state during this time. This initial cooldown process is referred to as the pre-cooling mode. Additionally, the housing for the heat pipe may provide another effective heat flow path whilst the system is at non-cryogenic temperatures, even though the coolant may be entirely gaseous during this time, as could convection of the gaseous coolant.

The system and method find particular benefit at low temperatures, as discussed above. Typically, the temperature of the second cooled stage is between 25 kelvin and 27 kelvin during the heat pipe cooling mode. Furthermore the temperature of the second cooled stage is typically between 4 kelvin and 27 kelvin during the gas gap cooling mode.

The heat pipe and the heat switch assembly together form a thermal switch that may be operated to enable the target assembly to reach temperatures below that of the second cooled stage, as discussed above. It is particularly desirable therefore that the target assembly comprises a target refrigerator and the method further comprises the following steps:

v) evacuating the one or more gas gap heat switches after step (iv) so as to substantially thermally isolate the target assembly from the second cooled stage; and vi) cooling the target assembly during a low temperature cooling mode by operating the target refrigerator so as to cause the target assembly to adopt a temperature below the first and second cooled stages.

Steps (i) to (vi) are typically performed in sequence. Step (v) is typically performed once when the target assembly and the second cooled stage are at approximate thermal equilibrium (for example to within 1 kelvin of each other). Step (v) may therefore be performed in response to a monitored temperature obtained for the target refrigerator and the second cooled stage. Alternatively it may be decided that the target refrigerator and the second cooled stage are in approximate thermal equilibrium based on a monitored temperature for only one or neither of these components by instead using information acquired from past experiments.

Heat transfer across the heat pipe effectively stops once the coolant within the heat pipe freezes in step (iv). Step (v) therefore prevents any further heat transfer between the second cooled stage and the target assembly. The thermal switch between the second cooled stage and the target assembly is therefore opened at this point. The temperature of the target assembly is preferably below 5 kelvin during the low temperature cooling mode and preferably still below 4 kelvin.

BRIEF DESCRIPTION OF THE DRAWINGS

Embodiments of the invention will now be described with reference to the accompanying drawings in which.

DETAILED DESCRIPTION

Figure 1:
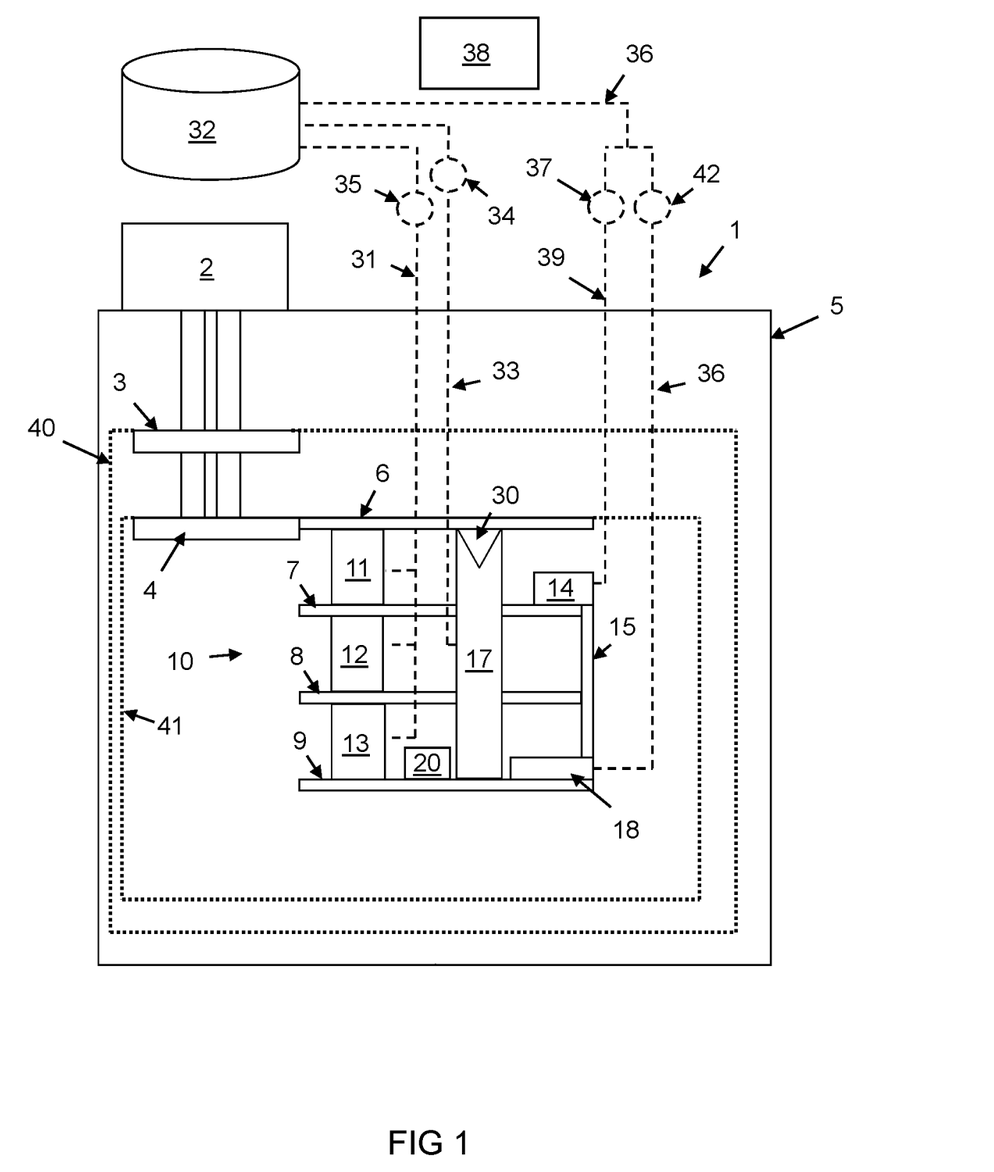
FIG. 1 is a schematic illustration of a cryogenic cooling system in accordance with a first embodiment.

A first embodiment of a cryogenic cooling system will now described. With reference to FIG. 1, there is illustrated a sectional view of the interior of a cryogen-free cooling system the main part of which is a cryostat 1. Cryostats are well known in the art and are used to provide low temperature environments for various apparatus. The cryostat 1 is typically evacuated when in use, this being to improve the thermal performance by the removal of convective and conductive heat paths through any gas within the cryostat. The cryostat 1 in the present example is a cryogen-free cryostat in that it does not contain a reservoir of liquid helium, the cooling of the cryostat instead being achieved by use of conductive cooling from a mechanical refrigerator. However, despite the "cryogen-free" term, some coolant (in this case helium) is typically present within the cryostat when in use, including in the liquid phase.

The main cooling power of the cryostat 1 is provided by a mechanical refrigerator in the form of a pulse tube refrigerator (PTR) 2. PTRs are also known for use in cryogen-free applications and typically provide cooling power at one or more low temperature stages within the cryostat 1. In the present case, the PTR 2 cools a first stage 3 of the PTR to about 50 to 70 kelvin and a second stage 4 of the PTR 2 to about 3 to 5 kelvin. The cryostat 1 is formed as a large hollow cylinder, typically formed from stainless steel or aluminium, which comprises an outer vacuum vessel 5. Ports (not shown) may be provided in the cryostat 1 to enable an experimental "probe" to pass into the interior of the cryostat 1 for providing sample delivery whilst maintaining a vacuum inside the cryostat 1. Various heat radiation shields are provided inside the outer vacuum vessel 5, wherein each shield encloses each of the remaining lower base temperature components. In FIG. 1 a first heat radiation shield 40 is shown connected directly to the first stage 3 and a second heat radiation shield 41 is shown connected directly to the second stage 4.

A low temperature assembly 10 is positioned within the cryostat 1, this acting as a tiered platform within the vacuum environment. Most of the various apparatus for performing low temperature procedures, such as experiments, is mounted to the assembly 10. The assembly 10 comprises a first platform 6, a second platform 7, a third platform 8 and a fourth platform 9. Each platform is formed from high conductivity copper and is spaced apart from another platform by low thermal conductivity rods. Each platform 6, 7, 8, 9 may be connected to a respective heat radiation shield (not shown for sake of clarity), in a similar manner to the first and second heat radiation shields 40, 41 in order to reduce any unwanted thermal communication across the assembly 10.

This first platform 6 connects the second stage 4 of the PTR 2 to the upper end of a heat pipe 17. The first platform 6 is configured to reach a base temperature of around 4 kelvin due to the cooling effect of the second stage 4. The second platform 7 supports the still 14 of a dilution refrigerator 15 and is cooled by the still 14 during use. The second platform 7 therefore typically has a base temperature of 0.5-0.7 kelvin. The third platform 8 acts primarily as an intermediate thermal stage between the second and fourth platforms 7, 9 and achieves a base temperature of 50-100 millikelvin when the dilution refrigerator 15 is fully operational. The fourth platform 9 supports a mixing chamber 18 of the dilution refrigerator 15 and a target apparatus 20. The fourth platform 9 is further connected to the lower end of the heat pipe 17. The fourth platform 9 is cooled by the mixing chamber 18 during use and so typically reaches a base temperature of 3-7 millikelvin.

The combination of the fourth platform 9, the target apparatus 20 and the mixing chamber 18 form a target assembly. The components of the target assembly are in a close thermal communication with each other and so will adopt the same temperature during operation of the system. The target assembly is configured to be cooled to a lower temperature than the remaining components of the cryostat 1. The target apparatus 20 comprises a docking station for receiving a sample holder configured to support a sample on which low temperature experiments are performed. The target apparatus 20 can have a high mass (for example over 10 kg) and in this case has a mass of 50 kg. High masses such as this conventionally require long cool-down times due to their corresponding high thermal masses. According to the apparatus and technique described however this cool-down time is significantly reduced.

A heat switch assembly, formed of three gas gap heat switches 11, 12, 13, extends across the low temperature assembly 10. The first gas gap heat switch 11 has an upper end that is connected to the first platform 6, and a lower end that is connected to the second platform 7. The second gas gap heat switch 12 has an upper end that is connected to the second platform 7, and a lower end that is connected to the third platform 8. The third gas gap heat switch 12 has an upper end that is connected to the third platform 8, and a lower end that is connected to the fourth platform 9.

Figure 3:
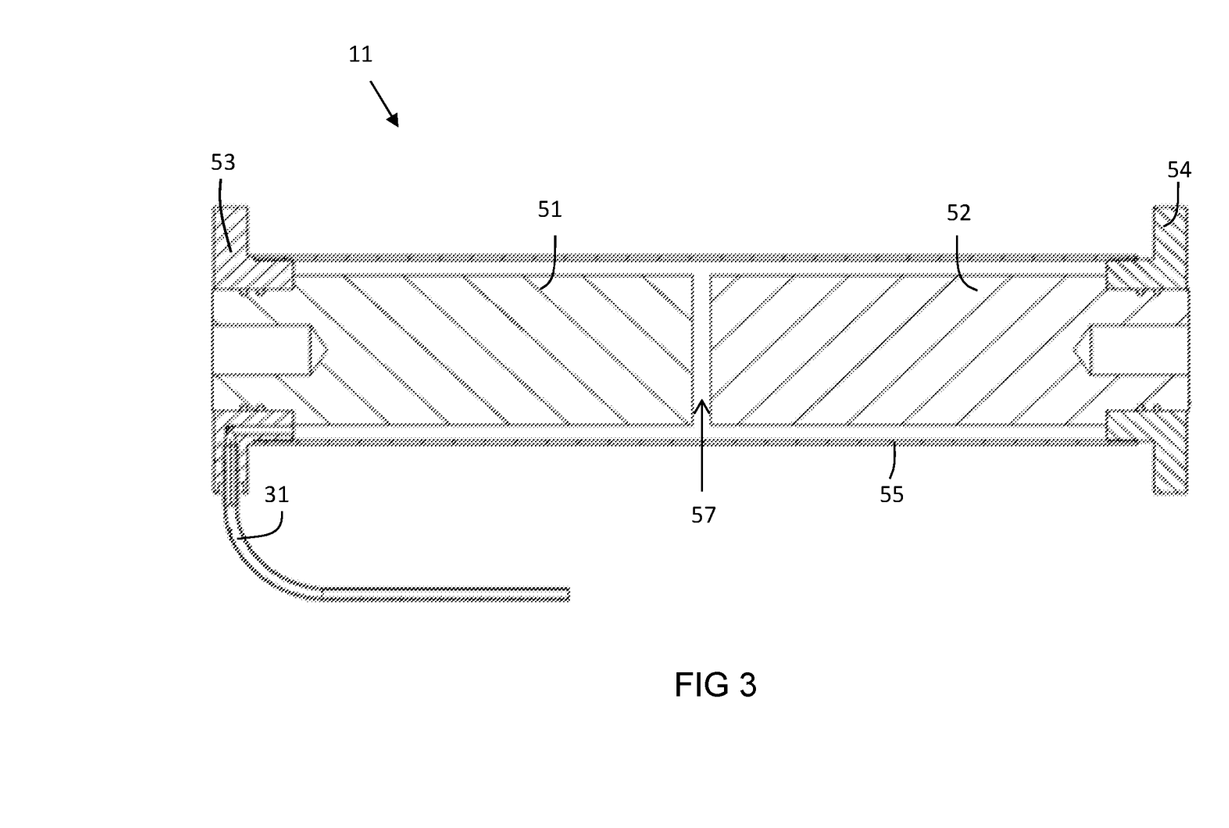
FIG. 3 is a schematic illustration of a gas gap heat switch for use in the systems of the first and second embodiments.

The operation and construction of each of the gas gap heat switches is the same. For sake of example, FIG. 3 illustrates the construction of the first gas gap heat switch 11 in further detail. The first gas gap heat switch 11 comprises a housing formed of a cylindrical sleeve 55 and first and second flanges 53, 54 that are connected to opposite ends of the sleeve 55. The housing is formed of stainless steel and so has a low thermal conductivity at cryogenic temperatures. The first and second flanges 53, 54 are directly mounted to the first and second platforms 6, 7 respectively (FIG. 1).

First and second conductors 51, 52 are collinearly arranged inside the housing of the first gas gap heat switch 11. These cylindrical conductors are formed of copper and so have a high thermal conductivity at cryogenic temperatures. At their distal ends, the first and second conductors 51, 52 are connected to the first and second flanges 53, 54 respectively. At their proximal ends, the opposing faces of these conductors 51, 52 are separated by a small gap 57 during operation (having a minimum length of typically less than 0.1 mm). A gas supply line 31 is provided for providing an input of thermally conductive gas inside the housing so as to cause heat conduction between the conductors 51, 52 across the gap 57 when the heat switch 11 is closed. The thermally conductive gas chosen is typically helium-3 due to its low boiling point however it may additionally or alternatively comprise helium-4. The first gas gap heat switch 11 is opened by evacuating the housing so as to prevent heat conduction across the gap 57. At cryogenic temperatures, this substantially thermally isolates the first flange 53 from the second flange 54, thereby preventing heat transfer across the first gas gap heat switch 11.

A heat pipe 17 is arranged in parallel to the heat switch assembly. A first part of the heat pipe 17 (provided at its upper end) is connected directly to the first platform 6 and a second part of the heat pipe 17 (provided at its lower end) is connected directly to the fourth platform 9. The heat pipe 17 can be thought of as a closed hollow cylinder formed substantially of stainless steel. At its upper end, the heat pipe 17 has an internal upper surface 30 formed of copper and which may be shaped in a frusto-conical manner (or as a hyperbolic cone) so as to provide a point positioned approximately centrally within the cylinder (effectively along its axis). The upper surface 30 is provided with an electric heater (not shown) in the form of a resistive wire. This heater may be operated so as to control the temperature of the upper surface 30.

The principle of operation of a heat pipe 17 is as follows. The interior of the heat pipe 17 contains a coolant (in this case neon), which forms a heat transfer medium. The amount of cryogen used for the coolant is calculated based upon the operational temperature and pressure for the heat pipe 17. The useful temperature range of a heat pipe 17 is defined by the boiling point and the melting point of the cryogen inside it. A strong thermal link is achieved across both ends end of the heat pipe 17 when the temperature of the upper end of the heat pipe causes the gaseous cryogen to condense. Gravity then draws the liquid condensate down to the lowest point of the upper surface 30 from which it then drips directly to the lower end. The liquid arriving at the lower end of the heat pipe 17 absorbs heat from the lower end which causes the cryogen to evaporate and then pass upwards to the upper end. Upon contacting the upper surface 30, the cryogen gas again condenses and falls onto the lower end as a liquid. Thus, a cycle is set up which is gravity-driven.

The continuous process of condensation on the upper surface 30 and the evaporation on the lower surface produces a strong thermal link between the two respective ends of the heat pipe 17. This link is substantially weakened if the upper end reaches a temperature which is too high for the condensation of the gas at a given operational pressure within the heat pipe. The thermal link therefore becomes significantly weakened since, although gaseous convection may occur, the enthalpy associated with the change of state between gas and liquid is no longer available. Conversely, if the temperature of the upper end (or indeed of the lower end) is sufficiently low so as to cause solidification of the cryogen the thermal cycle effect ceases and the respective ends become thermally isolated from one another.

Returning now to FIG. 1, a coolant circuit is provided to achieve normal operation of the dilution refrigerator 15. Here a first line in the form of a condensing line 36 connects a first side of the cooling circuit, via external pumps 37, to the interior of the dilution refrigerator 15. A second line, in the form of a still pumping line 39, connects a second side of the dilution refrigerator 15 to the pumps 37, 42. One of the pumps is a powerful turbomolecular pump 37 for providing a high vacuum on the low pressure side of the circuit (for example less than 0.1 mbar); another is a small compressor pump 42 for pumping coolant in the condensing line (at 0.5 to 2 bar). When in use operational fluid (a mixture of helium-4 and helium-3 isotopes) is provided from an external storage vessel 32, liquefied in the dilution refrigerator and then circulated according to the normal operation of such a refrigerator.

The storage vessel 32 is further configured to supply thermally conductive gas to each of the gas gap heat switches 11, 12, 13 via the gas supply line 31. The supply of thermally conductive gas through the gas supply line 31 is controlled by operation of the gas pump 35, or under the pressure applied by the storage vessel 32. Another storage unit is provided within the storage vessel 32 for supplying the coolant for the heat pipe 17 along a heat pipe supply line 33 and to the heat pipe 17. The flow of operational fluid along the heat pipe supply line 33 is controlled by operation of a heat pipe pump 34 or under the pressure applied by the storage vessel 32. The quantity of operational fluid within the heat pipe 17 may be adjusted so as to promote heat transfer across the heat pipe 17 across a broader temperature range than would otherwise be achieved using a fixed quantity of operational fluid. Hence the pressure of the coolant inside the heat pipe 17 may be controlled so as to maintain it as a liquid/gaseous mixture.

In an alternative embodiment the storage units for the heat switches and the heat pipe may form part of the low temperature assembly located inside the second thermal radiation shield. A common storage unit may be provided for all of the gas gap heat switches (as per FIG. 1) or each gas gap heat switch may be provided with a dedicated storage unit for that switch.

A control system 38 of the first embodiment controls each of the parts of the system including the operation of the refrigerators, heater, pumps and associated valves, the monitoring of sensors and the operation of other ancillary equipment to perform desired procedures on the sample. A suitable computer system is used to achieve this, although manual control is also envisaged.

Figure 2:
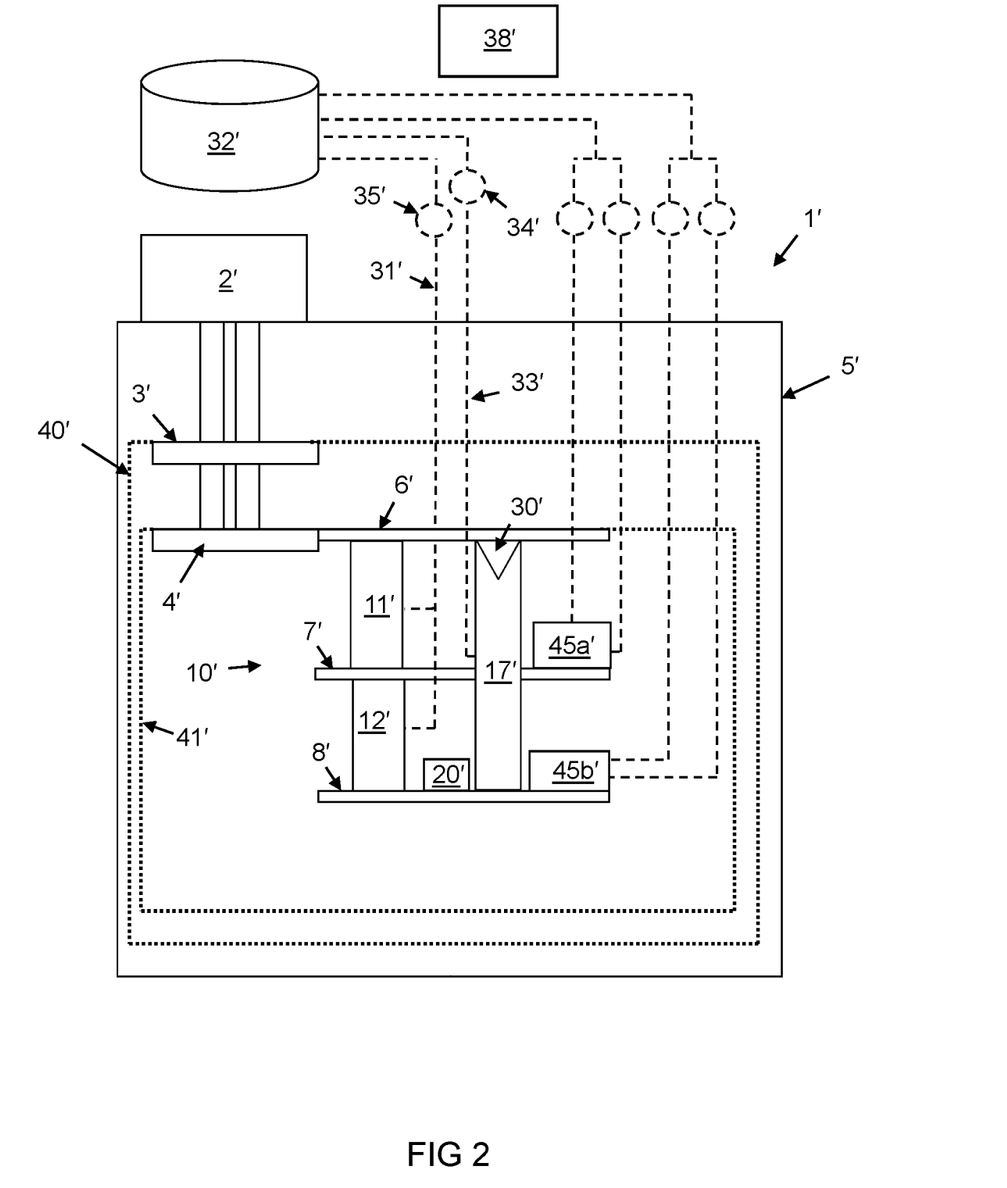
FIG. 2 is a schematic illustration of a cryogenic cooling system in accordance with a second embodiment.

A second embodiment of a cryogenic cooling system will now be briefly described with reference to FIG. 2. The second embodiment is broadly similar to the first and primed reference numerals have been used to show like features. The second embodiment differs from the first most notably in that a continuous helium-3 refrigerator is provided instead of the dilution refrigerator 15. The continuous helium-3 refrigerator comprises a first bath 45a' and a second bath 45b'. The first bath 45a' is configured to contain liquid helium-4, typically at a base temperature of 1.3 kelvin, and the second bath 45b' is configured to contain liquid helium-3, typically at a base temperature of 0.3 kelvin. A dedicated set of conduits and pumps is provided for each of the baths 45a', 45b' in order to allow for circulation of the fluid contained therein. The helium-3 refrigerator is operated according to conventional techniques to cool the target apparatus 20' to temperatures below the base temperature of the second stage 4' of the PTR 2'.

The low temperature assembly 10' of the second embodiment has three platforms and two gas gap heat switches 11', 12'. The first gas gap heat switch 11' extends between the first platform 6' and the second platform 7'. The second gas gap heat switch 12' extends between the second platform 7' and the third platform 8'. The sample 20' and the second bath 45b' are provided on the third platform 8'. The first bath 45a' is provided on the second platform 7'. The upper end of the heat pipe 17' is coupled to the first platform 6' and the lower end of the heat pipe 17' is coupled to the third platform 8'. Different base temperatures for each platform will be achieved in the second embodiment than for the first embodiment however the principle of operation is broadly the same.

Figure 4:
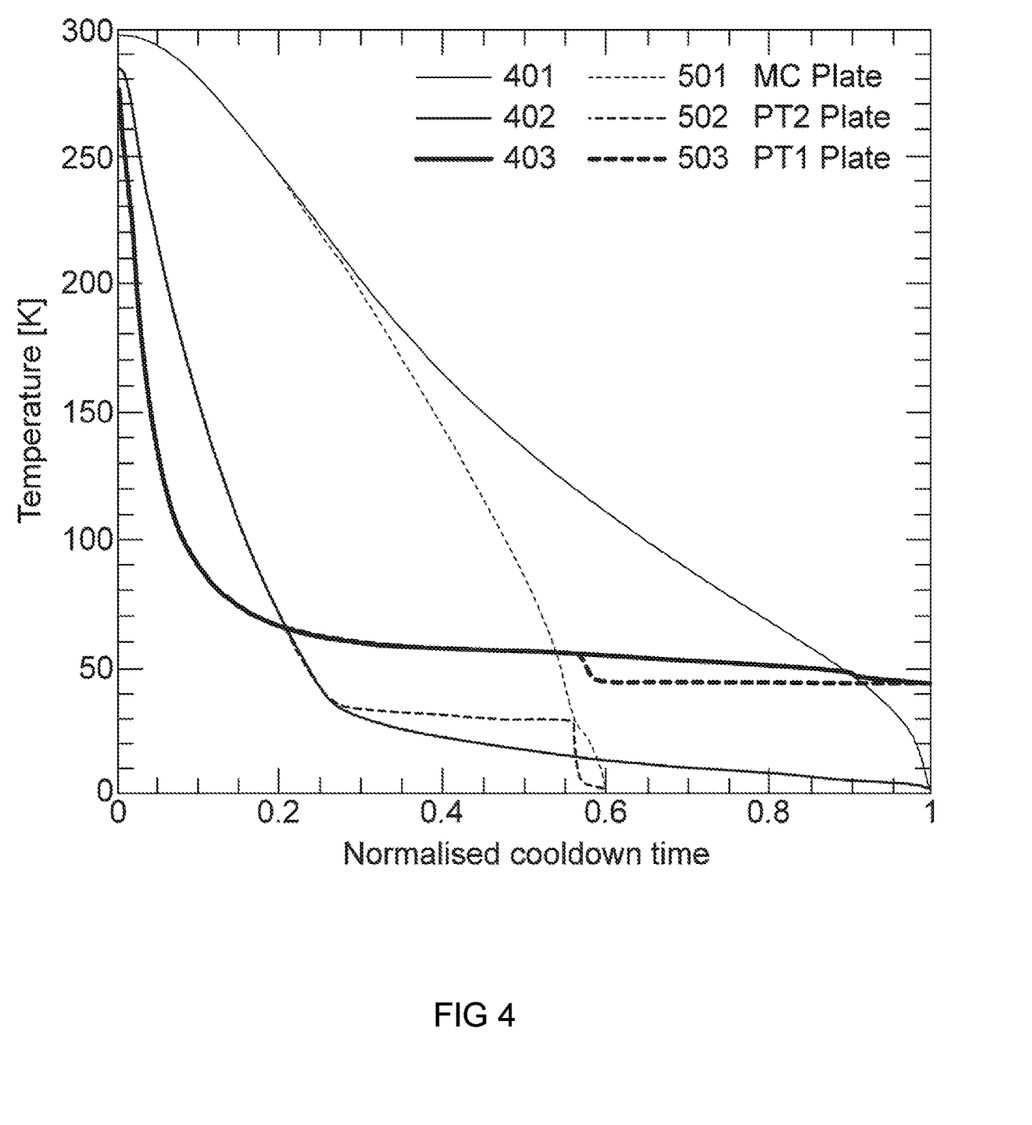
FIG. 4 is a graph illustrating a comparison of the cool down time for components of the first embodiment and a comparative example.
Figure 5:
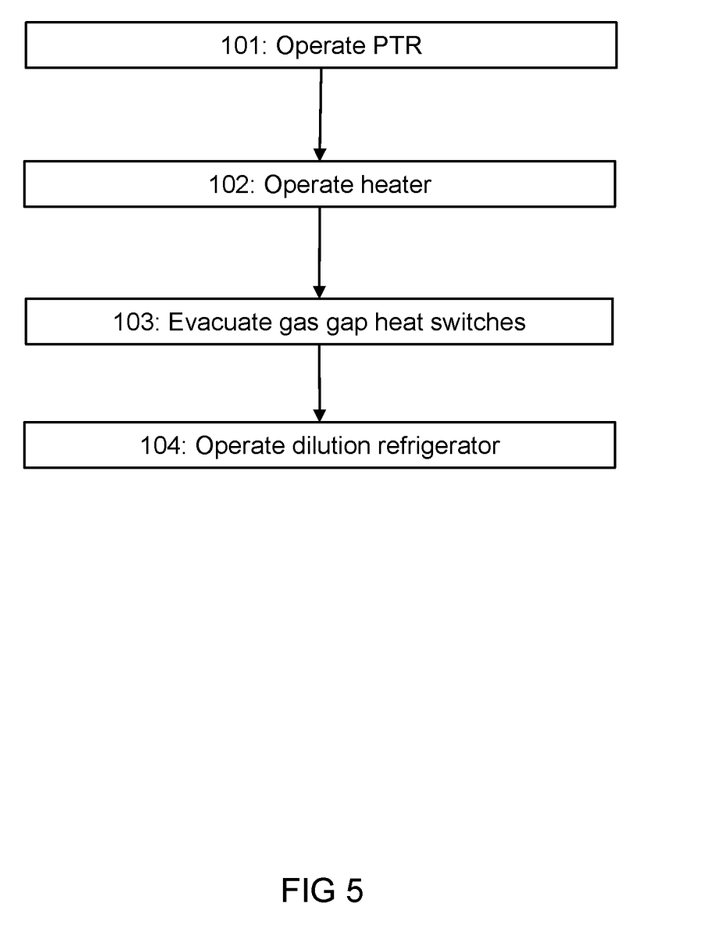
FIG. 5 is a flow diagram illustrating an embodiment of a method for operating the cryogenic cooling system of the first embodiment.

An embodiment of a method for operating the cooling system described by the first embodiment will now be discussed with reference to the flow diagram of FIG. 5. In addition, reference is made to FIG. 4 in which the temperatures of different components of the system of the first embodiment are plotted on a temperature-time graph. FIG. 4 further shows the temperatures of these components within a comparative example identical to the first embodiment (using a 50 kg target apparatus) but in which no heat pipe is provided. The ordinate (y-axis) illustrates temperature (shown in kelvin) and the abscissa (x-axis) illustrates the normalised cool down time in which "1" corresponds to an elapsed time of approximately 70 hours.

The temperature of the mixing chamber 18 according to the first embodiment is shown as profile 501 whereas the temperature of the mixing chamber according to the comparative example is shown as profile 401 (both labelled "MC plate"). The sample 20 is in close thermal communication with the mixing chamber 18 and so can be assumed to have a temperature approximately equal to the mixing chamber at all times. Profile 501 may hence be considered as showing the temperature of the target assembly. The temperature of the second stage 4 of the PTR 2 according to the first embodiment is shown as profile 502 whereas the temperature of the second stage of the PTR according to the comparative example is shown as profile 402 (both labelled "PT2 Plate"). Lastly, the temperature of the first stage 3 of the PTR 2 according to the first embodiment is shown as profile 503 whereas the temperature of the first stage of the PTR according to the comparative example is shown as profile 403 (both labelled "PT1 plate").

The system is initially at an ambient temperature of around 290-300 kelvin, at which point the operational fluid for the dilution refrigerator 15 is contained within the storage vessel 32. The heat pipe 17 contains a predetermined quantity of the operational fluid (in gaseous form) and the gas gap heat switches 11, 12, 13 each contain a predetermined quantity of the thermally conductive gas. Then, at step 101, the PTR 2 is operated so as to begin a cool down process (starting at a normalised time of zero) in which the system is brought to cryogenic temperatures. The initial cooling process, during which the heat pipe 17 is too warm for its operational fluid to condense, is referred to as the "pre-cooling mode". Heat transfer instead occurs across the low temperature assembly 10 predominantly via the gas gap heat switches 11, 12, 13. The first stage 3 of the PTR 2 initially cools at a much faster rate than the second stage 4 during the pre-cooling mode. This is illustrated by the relative negative gradients of the curves illustrating the temperature of the first and second stages 3, 4 for the normalised time period of 0-0.1. The first and second stages 3, 4 are at approximately the same temperature at a normalised time of 0.2 and from thereafter the second stage 4 has a lower temperature than the first stage 3. The second stage 4 then continues to cool to at a faster rate until it temporarily stabilises at around 45 kelvin during a normalised time period of 0.25-0.55.

The components of the systems of the first embodiment and the comparative example each cool at approximately the same rate up until a normalised time of 0.25. At this point the temperature of the second stage 4 is sufficiently cold to cause the operational fluid within the heat pipe 17 to condense at the upper end 30. A "heat pipe cooling" mode then begins within the first embodiment and continues until a normalised time of 0.55.

At a normalised time of 0.25 the temperature of the upper surface 30 of the heat pipe 17 causes the coolant within the heat pipe 17 to condense. The condensed neon falls under gravity from the upper end of the heat pipe 17 to the lower end of the heat pipe 17 and evaporates upon contact with the base (as earlier described). This process cools the lower end of the heat pipe 17 rapidly and in so doing cools the mixing chamber 18 (which is in close thermal communication with the lower end of the heat pipe 17). The heat pipe 17 is operational during the heat pipe cooling mode so as to provide a significantly increased effective thermal conductivity between the upper and lower ends of the low temperature assembly 10. This is evident from the divergence between profiles 401 and 501.

FIG. 4 further illustrates how the temperature 502 of the second stage 4 in the first embodiment is higher whilst the heat pipe 17 is operational than it is in the comparative example. This elevated temperature is partly the result of more heat being conducted from the mixing chamber 18 to second stage 4 in the first embodiment. By contrast, in the comparative example the absence of the heat pipe enables the second stage 4 to cool more rapidly between a normalised time of 0.25 and 0.55 without this warming influence.

The heater within the upper surface 30 of the heat pipe 17 is operated at step 102 so as to prevent the temperature of the upper surface 30 from reducing sufficiently so as to cause the coolant to freeze. In the present embodiment this control is achieved using a temperature sensor arranged on first platform 6, and the power supplied to the electric heater is modulated so as to keep the monitored temperature above 24.6 kelvin. This heating contributes further to the elevated temperature of the second stage 4 within the first embodiment relative to the comparative example between a normalised time of 0.25 and 0.55.

A second temperature sensor is arranged to monitor the temperature of the mixing chamber 18 and target apparatus 20. The heater is turned off when the temperature of the mixing chamber 18 falls to below a predetermined value (in this example 30 kelvin). The temperature of the second stage 4 is then allowed to reduce so as to cause the operational fluid within the heat pipe 17 to begin to freeze. This occurs when the temperature of the upper surface 30 is 24.6 kelvin or less.

A "gas gap cooling mode" begins when the operational fluid within the heat pipe 17 has completely frozen. This occurs at a normalised time of 0.55. At this point heat is principally transferred between the second stage 4 and the mixing chamber 18 by virtue of the thermally conductive gas inside the gas gap heat switches 11, 12, 13. The heat pipe 17 is in no longer operational during this mode and so the effective thermal conductivity between the second stage 4 and the mixing chamber 18 is significantly less than it was during heat pipe cooling mode. The temperature of the second stage 4 therefore reduces more rapidly than it did during the heat pipe cooling mode because it is less influenced by the warmer mixing chamber 18. This is visible by the decrease in the gradient of profile 502 during the normalised time period of 0.55-0.57. The temperature of the second stage 4 then decreases more gradually as it approaches its base temperature of 4 kelvin. The temperature of the first stage 3 also reduces as a consequence of the second stage 4 becoming cooler. This is visible from comparison of profiles 403 and 503 in FIG. 4.

The rate of cooling of the mixing chamber 18, as shown by profile 501, initially decreases upon entry to the gas gap cooling mode due to the weakened thermal link between it and the second stage 4. However, at a normalised time of 0.57 the temperature of the second stage 4 has reduced sufficiently so as to promote an increase in the heat flow between the mixing chamber 18 and the second stage 4. The temperature of the mixing chamber 18 then reduces more rapidly until it is eventually equal to that of the second stage 4. At this point the thermally conductive gas within the gas gap heat switches 11, 12, 13 is evacuated using the gas pump 35 and returned to the storage vessel 32. This is performed at step 103. In an alternative embodiment the evacuation may be performed using one or more pumps internal to the cryostat, such as adsorption pumps. Such pumps may advantageously be operated automatically during the cooldown process based on the temperature of the gas gap heat switches 11, 12, 13.

The point at which the second stage 4 and the mixing chamber 18 are in thermal equilibrium may be monitored directly using the temperature sensors earlier described. In the illustrated embodiment this occurs at a normalised time of 0.6. In an alternative embodiment however no temperature sensors are provided as the cooling characteristics of the various components may instead be predicted based on past experiments according to the elapsed time. Alternatively the temperature of one component (e.g. the mixing chamber 18) may be inferred based on the monitored temperature of the other (e.g. the second stage 4) by using information acquired from previous experiments.

The evacuation of the thermally conductive gas places each of the gas gap heat switches into an open state and so as to thermally disconnect the different platforms 6, 7, 8, 9 from each other. This ends the gas gap cooling mode. A "low temperature cooling mode" is then initiated at step 104 wherein the dilution refrigerator 15 is operated so as to cause further cooling of the mixing chamber 18. In alternative embodiments step 104 may be initiated at the same time as step 103 or potentially before step 103. The low temperature cooling mode is the fourth and last cooling mode that occurs during the cooldown process. This cooling mode enables the dilution refrigerator 15 to reach its base temperature.

At step 104 the helium-3/helium-4 mixture is flowed from the storage vessel 32, through the coolant circuit and between the still 14 and the mixing chamber 18. Normal operation of the dilution refrigerator 15 will cause the temperature of the second, third and fourth platforms 7, 8, 9 to then reduce further until their respective base temperatures are reached. This may typically occur at a time period of 0.75 in the first embodiment. By contrast in the comparative example this will only occur at a normalised time period of 1.15. The heat pipe 17 enables a reduction in the cool down time of 40%: equating in this case to 28 hours. Larger reductions in the cool down time may occur in comparison to prior art cryogenic systems, such as where the second stage of the mechanical refrigerator is instead thermally connected to the target apparatus via a pre-cooling circuit. The combined use of the heat switch assembly and the heat pipe as herein discussed typically reduces the cooldown time by a factor of approximately 3.5 in comparison to such systems.

A cryogenic cooling system is therefore provided which advantageously enables faster cooling of a target assembly from room temperature to cryogenic temperatures. The system limits the consumption of liquid cryogens and removes the need for moving parts. Furthermore the method and system described is suitable for cooling high thermal mass target assembly in a relatively short timescale. This system therefore overcomes the problems identified above in connection with the prior art.

The invention claimed is:

1. A cryogenic cooling system comprising:
   a mechanical refrigerator having a first cooled stage and a second cooled stage, the second cooled stage being configured to reach a lower base temperature than the first cooled stage;
   a heat pipe having a first part coupled thermally to the second cooled stage and a second part coupled thermally to a target assembly, the heat pipe being adapted to contain a condensable gaseous coolant; and
   a heat switch assembly comprising one or more gas gap heat switches, the heat switch assembly having a first end coupled thermally to the second cooled stage and a second end coupled thermally to the target assembly.

2. The system according to claim 1, further comprising a target refrigerator, wherein the target assembly comprises a cooling element of the target refrigerator, said cooling element being configured to reach a lower base temperature than the first cooled stage and the second cooled stage.

3. The system according to claim 2, wherein the target refrigerator comprises a dilution refrigerator, the dilution refrigerator comprising a still, a cooled member and a mixing chamber, wherein the cooled member is arranged between the still and the mixing chamber, and wherein the mixing chamber forms the cooling element.

4. The system according to claim 3, wherein the heat switch assembly comprises a first gas gap heat switch, a second gas gap heat switch and a third gas gap heat switch; wherein the first gas gap heat switch is coupled thermally to the second cooled stage and the still, wherein the second gas gap heat switch is coupled thermally to the still and the cooled member, and wherein the third gas gap heat switch is coupled thermally to the cooled member and the mixing chamber.

5. The system according to claim 1, further comprising a cooled member arranged between the second cooled stage and the target assembly;
   wherein the heat switch assembly comprises a first gas gap heat switch coupled thermally to the second cooled stage and the cooled member, and a second gas gap heat switch coupled thermally to the cooled member and the target assembly.

6. The system according to claim 1, wherein the cryogenic cooling system is adapted to be operated in a heat pipe cooling mode in which the temperature of the second cooled stage is lower than the first cooled stage, and wherein the temperature of the target assembly causes the coolant within the second part of the heat pipe to be gaseous and the temperature of the second cooled stage causes the coolant in the first part of the heat pipe to condense, whereby the target assembly is cooled by the movement of the condensed liquid coolant from the first part of the heat pipe to the second part of the heat pipe;

wherein the cryogenic cooling system is further adapted to be operated in a gas gap cooling mode in which the temperature of the second cooled stage causes freezing of the coolant; and wherein the heat switch assembly is adapted to provide cooling from the second cooled stage to the target assembly during the gas gap cooling mode via the one or more gas gap heat switches.

7. The system according to claim 6, wherein the one or more gas gap heat switches are configured to contain a thermally conductive gas during the gas gap cooling mode.

8. The system according to claim 7, wherein each of said gas gap heat switch comprises a stainless steel wall configured to contain the thermally conductive gas so as to cause thermal conduction across the switch.

9. The system according to claim 7, wherein each of said gas gap heat switch comprises two elongate conductors aligned along a common major axis, wherein said elongate conductors are separated from each other by a gap configured to contain the thermally conductive gas during the gas gap cooling mode.

10. The system according to claim 7, wherein the heat switch assembly is further configured to remove the thermally conductive gas from the one or more gas gap heat switches so as to substantially thermally isolate the second cooled stage from the target assembly.

11. A system according to claim 7, further comprising a target refrigerator, wherein the target assembly comprises a cooling element of the target refrigerator, said cooling element being configured to reach a lower base temperature than the first cooled stage and the second cooled stage, and wherein the cryogenic cooling system is further adapted to be operated in a low temperature cooling mode in which the coolant is frozen, the thermally conductive gas is removed from the one or more gas gap heat switches and the target assembly is cooled by the cooling element so as to reach a lower temperature than the first cooled stage and the second cooled stage.

12. The system according to claim 1, wherein the target assembly comprises a target apparatus provided as a docking station arranged to receive a sample carrier that supports a sample.

13. The system according to claim 1, wherein the heat pipe comprises a housing defining an internal volume for containing the coolant, and which contains the first and second parts of the heat pipe in fluid communication with one another, wherein the housing comprises stainless steel.

14. The system according to claim 1, wherein the condensable coolant for the heat pipe comprises neon.

15. The system according to claim 1, wherein the mechanical refrigerator is selected from the group comprising: a pulse tube refrigerator, a Stirling refrigerator and a Gifford-McMahon refrigerator.

16. A method of operating a cryogenic cooling system, the cryogenic cooling system comprising a mechanical refrigerator having a first cooled stage and a second cooled stage, the second cooled stage being configured to reach a lower base temperature than the first cooled stage; a heat pipe having a first part coupled thermally to the second cooled stage and a second part coupled thermally to a target assembly, the heat pipe containing a condensable gaseous coolant, a heat switch assembly comprising one or more gas gap heat switches, the heat switch assembly having a first end coupled thermally to the second cooled stage of the mechanical refrigerator and a second end coupled thermally to the target assembly;

the method comprising the following steps:
i) causing the target assembly to adopt a temperature sufficient to ensure the coolant within the second part of the heat pipe is in the gaseous phase;
ii) operating the mechanical refrigerator to cause the second cooled stage to adopt a temperature which causes the coolant within the first part of the heat pipe to condense;
iii) cooling the target assembly during a heat pipe cooling mode in which the temperature of the second cooled stage is lower than the first cooled stage by causing the movement of the condensed liquid coolant from the first part of the heat pipe to the second part of the heat pipe; and
iv) cooling the target assembly during a gas gap cooling mode in which the temperature of the second cooled stage causes the coolant within the heat pipe to freeze, and wherein further cooling of the target assembly is applied by the second cooled stage via the one or more gas gap heat switches.

17. The method according to claim 16, wherein the temperature of the second cooled stage is between 25 kelvin and 27 kelvin during the heat pipe cooling mode.

18. The method according to claim 16, wherein the temperature of the second cooled stage is between 4 kelvin and 27 kelvin during the gas gap cooling mode.

19. The method according to claim 16, wherein the target assembly comprises a target refrigerator, the method further comprising the following steps:
v) evacuating the one or more gas gap heat switches after step (iv) so as to substantially thermally isolate the target assembly from the second cooled stage; and
vi) cooling the target assembly during a low temperature cooling mode by operating the target refrigerator so as to cause the target assembly to adopt a temperature below the first cooled stage and the second cooled stage.

20. The method according to claim 19, wherein the temperature of the target assembly is below 5 kelvin during the low temperature cooling mode.

* * * * *